March 9, 1926.

E. J. HALL

PISTON AND METHOD OF MAKING SAME

Filed April 18, 1923

INVENTOR.
Elbert J. Hall.
BY Dewey, Strong,
Townsend & Loftus.
ATTORNEYS.

March 9, 1926.

E. J. HALL

PISTON AND METHOD OF MAKING SAME

Filed April 18, 1923  2 Sheets-Sheet 2

1,575,828

INVENTOR.
Elbert J. Hall
BY
ATTORNEYS.

Patented Mar. 9, 1926.

1,575,828

UNITED STATES PATENT OFFICE.

ELBERT J. HALL, OF BERKELEY, CALIFORNIA.

PISTON AND METHOD OF MAKING SAME.

Application filed April 18, 1923. Serial No. 632,916.

*To all whom it may concern:*

Be it known that I, ELBERT J. HALL, a citizen of the United States, residing at Berkeley, county of Alameda, and State of California, have invented new and useful Improvements in Pistons and Methods of Making Same, of which the following is a specification.

This invention relates to the design and method of making a piston, for use in an internal combustion engine, the object being to eliminate piston slap and at the same time permit the use of a greater amount of clearance between piston and cylinder walls, which decreases friction by having a proper fitting piston at normal running temperature.

When an internal combustion engine is first started, the piston is cold and the walls of the cylinder are also cold, but after a few minutes of running the piston becomes hot from the heat of the exploding gases and though the cylinder walls become warm, they are cold as compared to the piston. Now, due to the difference in their temperature, the piston size increases a greater amount than the cylinder in the period of warming up from a cold engine to a temperature of normal operation, thus making the clearance between the cylinder and piston less at running temperature than when cold. This condition applies when both the cylinder and the piston are of the same material and the effects are exaggerated when the piston is made of a material whose coefficient of expansion is greater than that of the cylinder material.

Due to this exaggerated condition, the common aluminum alloy pistons must be made with a great amount of clearance when cold, in order that they shall have the proper running clearance in the cylinder when the engine is warmed to its normal running temperature. This great amount of clearance, though necessary for the reasons above mentioned, allows the piston to slap from one side to the other in the cylinder as the direction of thrust reverses, causing noise, uneven wear, distortion, loss of power (due to leakage and friction) and oil pumping.

Ordinarily, an aluminum alloy piston has a slapping or vibration not only in a direction at right angles to the wrist pin but also a rocking movement in a direction parallel with the axis of the wrist pin. Aside from loss of compression due to a loose fitting piston the resulting vibration causes undue wear on the piston rings due to the fact that the piston is not kept parallel with the walls of the cylinder at all times.

To overcome these difficulties I construct a piston having its body portion cut or slotted to form a substantially U-shaped tongue. This tongue is located preferably on the side opposite the power stroke thrust and extends approximately one-third the circumference of the piston, so that it will be effective not only to reduce the slap at right angles to the wrist pin, but also a rocking of the piston in a direction parallel with the wrist pin. At each side of the base of the tongue there is a re-entrant slot or cut forming a wing or flap at each side of the tongue, which will be disposed in proximity with the wrist pin bearings and assist in maintaing the piston in alignment and eliminating the vibration or slapping in a direction parallel with the axis of the wrist pin.

During grinding of the piston the tongue is pulled in a slight distance and locked by a screw or bolt, so that normally the flap will project outwardly slightly on the adjacent walls of the piston. This construction will afford a close fit when the piston is relatively cool and the tongue will readily move inwardly when the piston expands under the action of high heat. The cut or slot which forms the tongue preferably does not extend entirely to the bottom of the skirt, as in prior devices, and thus the radial strength of the piston is preserved. I find that where the piston walls are slotted or cut entirely through to the bottom of the skirt there is a tendency for the piston to collapse and wear egg-shaped, to bind and pinch the lower ring and likewise to cause overheating of the wrist pin.

These disadvantages in common pistons I overcome by using a piston of new and improved design and method of manufacture, as hereinafter fully described.

Figure 1:
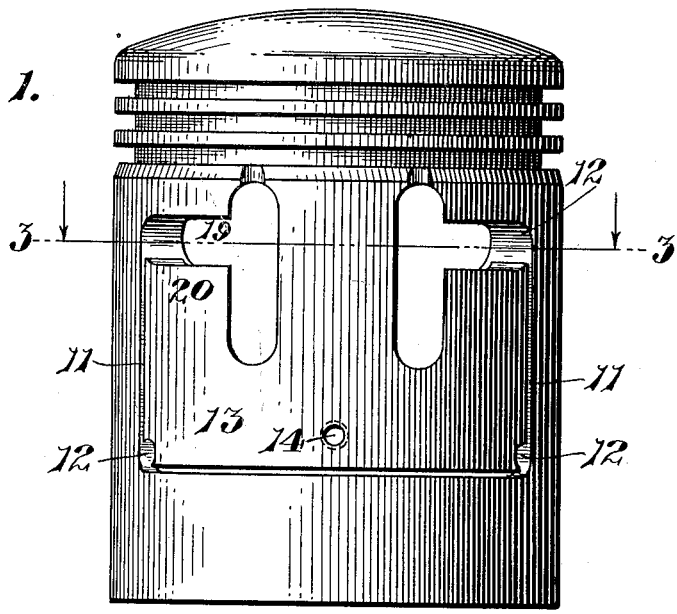
Fig. 1 shows a sectional view of a piston made in accordance with my design and method of manufacture.
Figure 2:
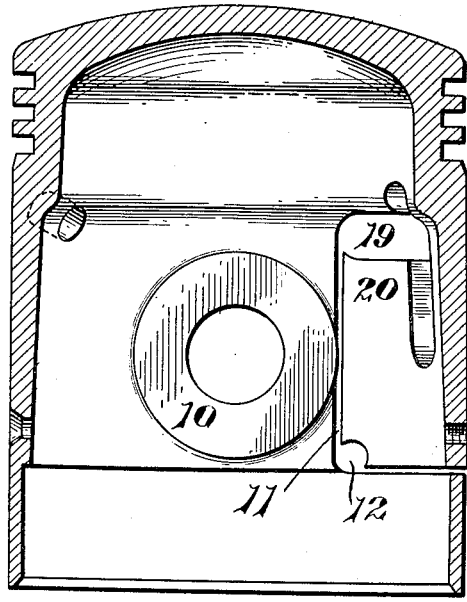
Fig. 2 is a part section and part full view of the same piston.
Figure 3:
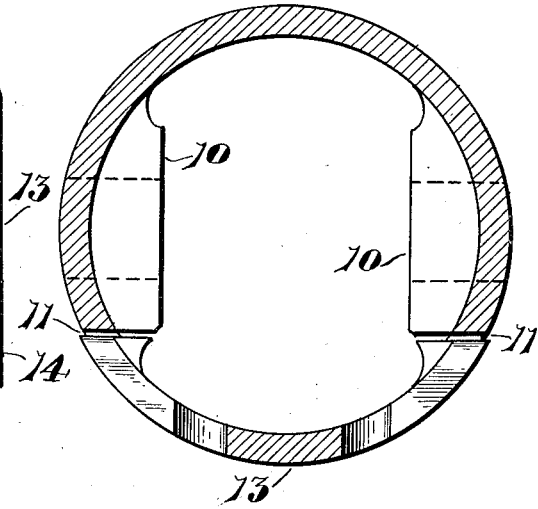
Fig. 3 is a plan section of the piston, taken on the line 3—3 of Fig. 1.
Figure 4:
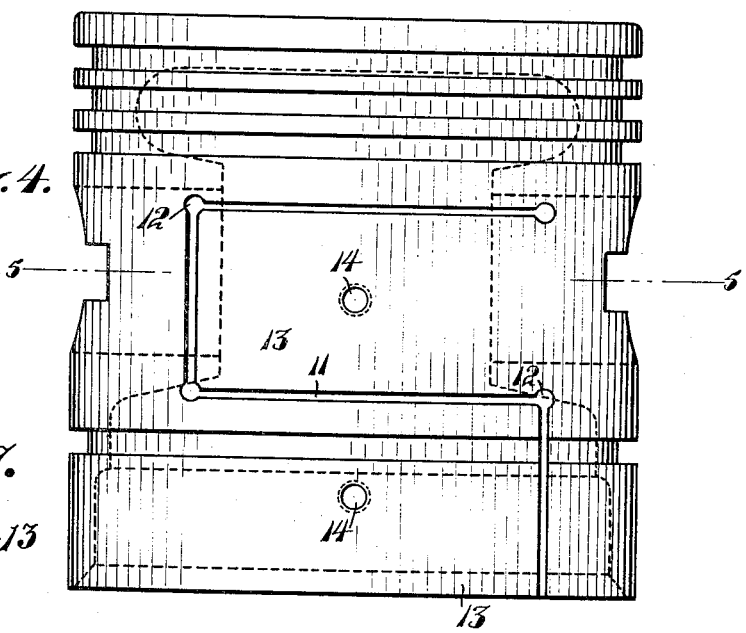
Fig. 4 is a full view of a piston, showing a slightly different form of cut.

In the drawings, I show a piston formed with pin bosses 10 and having its skirt portion formed with a cut or kerf 11, on one side at right angles to the pin bosses. This cut or kerf may be of various shapes. In Fig. 1 I show a U-shaped cut, and in Fig. 4 a sort of double L.

In the process of manufacture, holes 12 are drilled and mark the ends or intersections of the cut or kerf. The piston is rough turned to a predetermined diameter. The desired form of cut is then made, leaving one or more flaps or tongues 13. The piston skirt is now provided with tapped holes 14 on lines running through the said tongues 14. Into these tapped holes is inserted a screw 15, and thereby the tongues are drawn in a predetermined distance. Thereafter the piston is finish ground. When the screws are removed the tongues will spring out somewhat beyond the confines of the main body of the piston. The released tongue is then reground slightly on an arc struck from the center line of the piston. Usually the distance these flaps or tongues are pulled in is about one-half the depth of the finish grinding, say .035 of an inch. The final grinding of the released tongue should be such as to leave a projecting portion which for a considerable area is concentric with the walls of the piston.

The cut or kerf is located on the side opposite to the power stroke thrust and the tongue will thus serve to prevent piston slap. Having the same finish as the rest of the piston there is no likelihood of these tongues causing any scoring of the cylinder.

Aside from overcoming slapping of the piston, there is a certain damping of the vibrations resulting from this form of piston. As is well known, the pistons have their maximum rate of travel when their connecting rods are at right angles to their cranks, and, since this condition does not occur simultaneously in all cylinders, considerable vibration is set up. The spring action of the cut portions will absorb much of this vibration.

Figure 7:
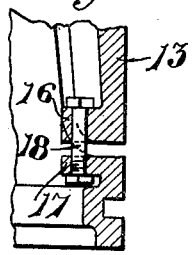
Fig. 7 shows a sectional view of a portion of the piston illustrating a modified form of means for holding the flap or tongue during grinding of the piston.
Figure 5:
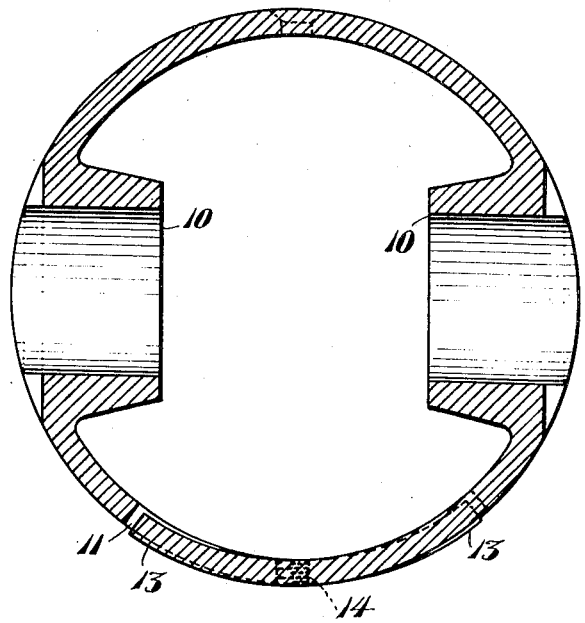
Fig. 5 shows a sectional view in plan, taken on the line 5—5 of Fig. 4.
Figure 6:
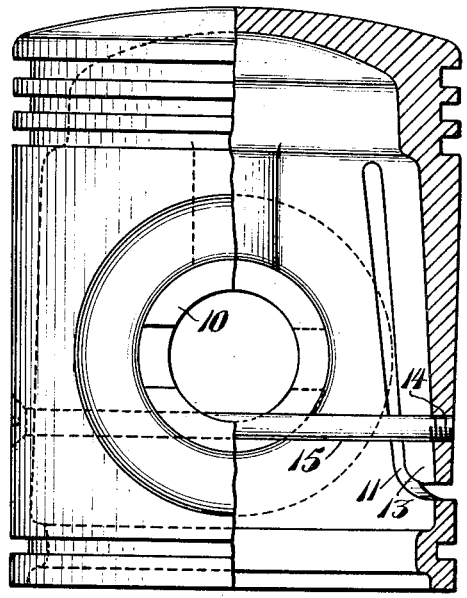
Fig. 6 is a view similar to that shown in Fig. 2, but showing the tongue pulled in by means of a screw.

In Fig. 7 I show a modified arrangement of means for holding in the tongue or flap during grinding. This consists of a lug 16 on the movable end of the tongue and a similar lug 17 on the adjacent portion of the piston skirt. These lugs have openings which align when the tongue is moved inwardly and are adapted to receive a bolt or pin 18 for retaining the said tongue in its retracted position.

The essential thing, however, is to have the tongue or flap project slightly when the piston is cool and this may be done either by springing it in during grinding or spring it out after grinding. Another feature of importance is to extend the tongue or flap over a substantial portion of the circumference of the piston, say, about one-third, so that it will be effective to prevent rocking or tilting of the piston in a direction longitudinally of the wrist pin. In this connection I prefer to form a re-entrant slot or cut 19 at the base of the tongue on each side thereof somewhat in the form of an L or T, thus leaving a wing or flap portion 20 which will project slightly from the surrounding walls of the piston. These wings being positioned near the wrist pin bearings will be particularly helpful in overcoming vibration or slapping longitudinally of the wrist pin and will permit of greater area of contact between the tongue and cylinder walls. By having a maximum area of contact between the water-cooled cylinder walls and the tongue, the cooling of the latter will be facilitated, and thus expansion of the piston will be reduced. Also, these wings at the base of the tongue, in conjunction with the tip of the tongue, will afford a balancing of forces and pressure both above and below the wrist pin, tending thereby to keep the piston in parallel relation with the cylinder walls at all times. Preferably, the slot or kerf forming the tongue is contained wholly within the marginal edges of the piston walls, so that the bottom of the skirt will be left intact. In this way I prevent collapsing of the piston walls radially and leave a solid, uninterrupted portion at the bottom for the reception of an oil ring.

Various changes in the several steps above set forth and in the shape and form of the piston may be employed without departing from the spirit of my invention as disclosed in the appended claims.

Having thus described my invention, what I claim and desire to secure by Letters Patent is:—

1. In a piston for internal combustion engines having a wrist pin mounted in the skirt portion, that side of the skirt opposite the power stroke thrust being cut to form a tongue, said skirt portion being also cut from its bottom to the base of the tongue and a piston ring retaining groove formed below the tongue.

2. In a piston for internal combustion engines having a wrist pin mounted in the skirt portion, that side of the skirt portion opposite the power stroke thrust being cut to form a circumferentially-extending tongue, said skirt portion being also cut from its bottom to the base of the tongue and the said piston being provided with a ring-retaining groove below and adjacent to the tongue.

ELBERT J. HALL.